Jan. 3, 1939.  J. C. McKEE  2,142,365
TRAILER HITCH
Filed July 25, 1936   2 Sheets-Sheet 1

INVENTOR.
J. Clyde McKee
BY Barnes, Kisselle, Laughlin & Raisch
ATTORNEY.

Jan. 3, 1939. J. C. McKEE 2,142,365
TRAILER HITCH
Filed July 25, 1936 2 Sheets-Sheet 2

INVENTOR.
J. Clyde McKee
BY Barnes, Kisselle, Laughlin & Raisch
ATTORNEY.

Patented Jan. 3, 1939

2,142,365

UNITED STATES PATENT OFFICE 2,142,365

TRAILER HITCH

John Clyde McKee, Salem, Ohio, assignor to Mullins Manufacturing Corporation, Salem, Ohio, a corporation of New York Application July 25, 1936, Serial No. 92,520

8 Claims. (Cl. 280—33.15)

This invention relates to a trailer hitch and it has to do especially with a construction useful for attaching a trailer to an automobile.

More particularly, the invention is directed to a hitch useful for attaching a two-wheel trailer to an automobile. In such trailers, the trailer load should be fairly nicely proportioned on the trailer axle for the best operation; for example, the trailer hitch should bear some load, or in other words, the load on the trailer is overbalanced slightly forwardly for the best operation. The structural parts of an automobile, such as a bumper or the like, to which the trailer hitch may be attached may vary in height on different automobiles. The principle object of the invention is to provide a simple hitch member for attachment to an automobile, or a part thereof such as a bumper, which, although of an extremely simple construction, is capable of providing a hitch connection in several vertical adjustments. This will compensate for the various heights of the structural part of an automobile to which the hitch is to be attached. It also makes feasible a selection of a proper height for the draft bar of a trailer so that the load on the trailer may be properly proportioned.

Figure 1:
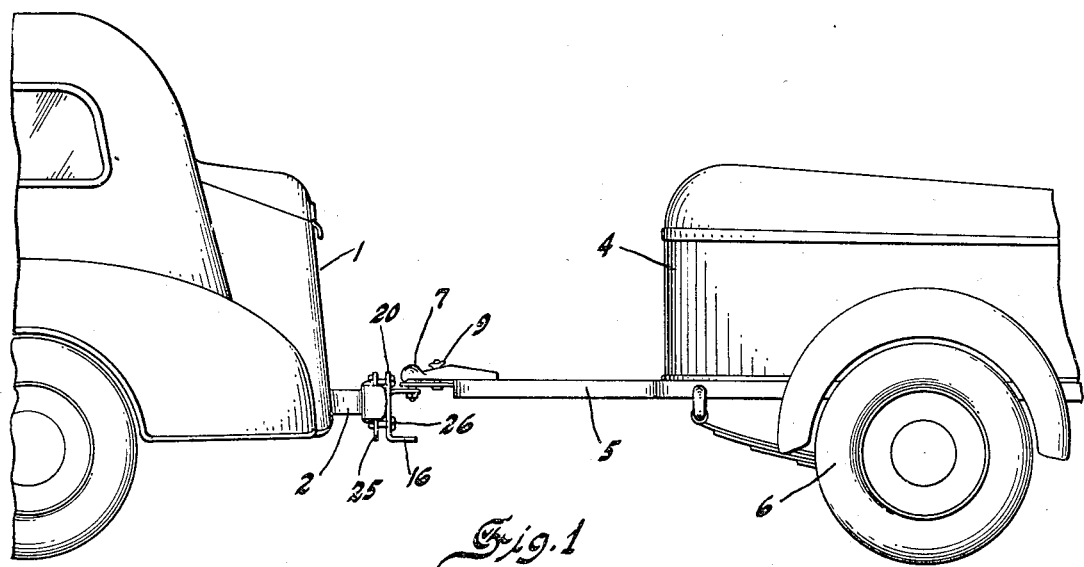
Fig. 1 is a general view illustrating the rear end of an automobile and a portion of a trailer attached thereto.

The rear end of an automobile is shown at 1 and the bumper structure at 2, and the bumper bar which extends transversely across the car is illustrated at 3. This is the member to which the hitch is attached for the purposes of the disclosure herein. A trailer is illustrated at 4 having a forward draft bar or pole 5, the trailer being of the two-wheel type, the wheels of the running gear being shown at 6. The trailer shown is of a relatively small handy type for various purposes, although it will be appreciated that the larger house type of trailer may be attached by the structure.

The attachment of trailers to automobiles is frequently in the form of a ball and socket joint and this type of joint or connection is shown herein. A socket piece 7 is attached to the draft bar 5. The socket may be opened and closed by a movable underpiece 8 controlled by a handle 9. This merely represents one form of socket although various socket structures may be used with the invention. The ball member shown at 10 has its stud 11 adapted to be passed through an aperture in a hitch plate or the like and be fastened by a nut 12. This of course is just one way of fastening the ball member in position.

The hitch plate advantageously takes the form of a single piece of metal which may be a stamping of metal of suitable gauge, or for that matter it may be a forging or otherwise shaped and formed. The hitch plate has a body 15 and one end is fashioned outwardly to form a support 16 and it may be provided with an aperture 17. The other end has an intermediate portion fashioned outwardly to form a support 18 which may be provided with an aperture 19 and on the opposite sides of the intermediate supporting portion, upstanding ears or projections 20 are provided which may lie in the same plane as the body. The hitch plate is formed with suitable apertures or groups of apertures some of which may be in the body and some in the projections 20. These apertures will be referred to in horizontal groups; for example, the projections 20 are provided with apertures 21; the body is provided with a group of apertures 22 and a group of apertures 23. The supports 16 and 18 are designed to receive the ball member 10, the stud portion 11 of which is screw threaded and passed through the aperture 17 or 19 and secured thereto by the nut 12.

One or more clamping plates or straps 25 may be used with the hitch plate and there are preferably two of such straps used. These straps are equipped with apertures 21a, 22a and 23a.

The hitch plate is secured to the cross bar 3 of the bumper by placing the hitch plate on one side of the bumper and the clamping straps on the opposite side and clamping the hitch plate and the straps to the bumper bar by suitable bolts 26. By the provision of the several groups of apertures, this simple structure may be attached to the cross bar so that the ball is capable of being located in several different horizontal planes and the variety of adjustment is increased by the optional use of the support 16 or the support 18 and also by reversing the hitch plate.

Figure 2:
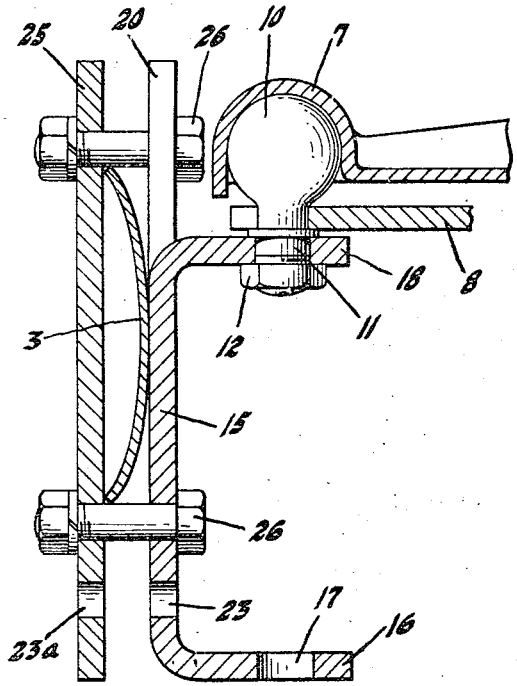
Fig. 2 is an enlarged cross sectional view of the attachment.

One manner of mounting the structure is shown in Fig. 2. In this view, the projections 20 of the hitch plate are uppermost and bolts are taken through the aligned apertures 21 and 21a; also bolts may be taken through the aligned apertures 22 and 22a. Preferably, these groups of apertures are spaced a distance approximating the width of the bumper bar, although this is not absolutely necessary, and the preferred installation is that the bolts extending across the bumper bar may ride thereon carrying the vertical load. The ball may be secured to the upper support 18 as shown in Fig. 2, if this is the desired elevation. The ball may be lowered by attaching it to the support 16.

Figure 4:
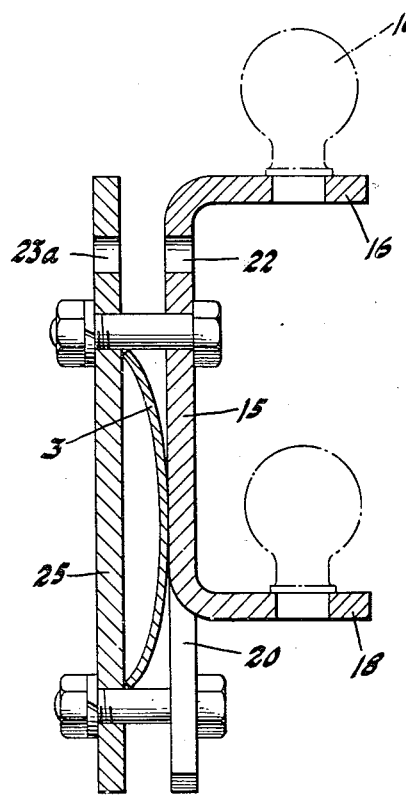
Fig. 4 is a similar enlarged cross sectional view showing a still further position of attachment.
Figure 5:
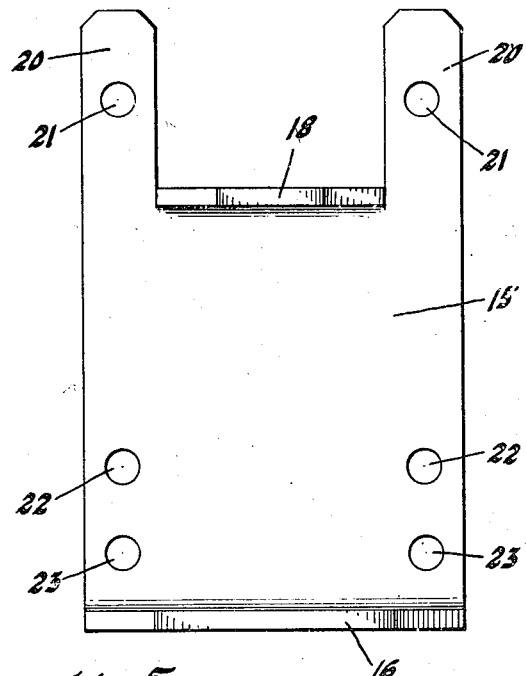
Fig. 5 is an elevational view of the hitch plate.
Figure 6:
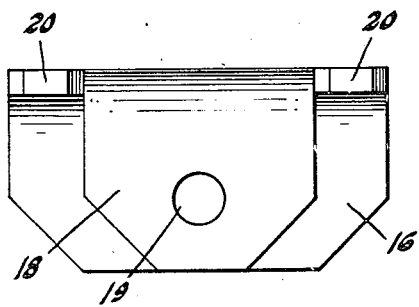
Fig. 6 is a top plan view thereof.
Figure 7:
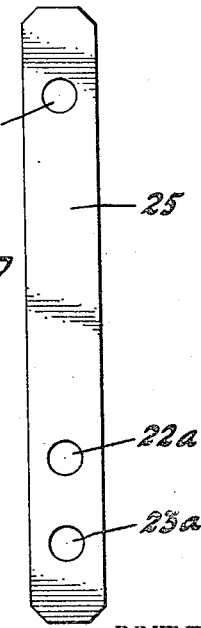
Fig. 7 is a view illustrating a clamping strap.

However, either of these positions may be just right, so the entire structure may be reversed as to its mounting as shown in Fig. 4 where the hitch plate is turned upside down. The straps may be turned upside down or may not be turned upside down so long as the bolts are taken through the apertures 21a and 22a, the spacing of which corresponds to the spacing of apertures 21 and 22 in the hitch plate. Now the ball may be located on the support 16 as illustrated by the dotted lines in Fig. 4 and it will be observed that the ball is considerably raised in height over that shown in Fig. 2. On the other hand, the ball may be fastened to the support 18 which is in an intermediate position relative to the two positions shown in Fig. 2.

Figure 3:
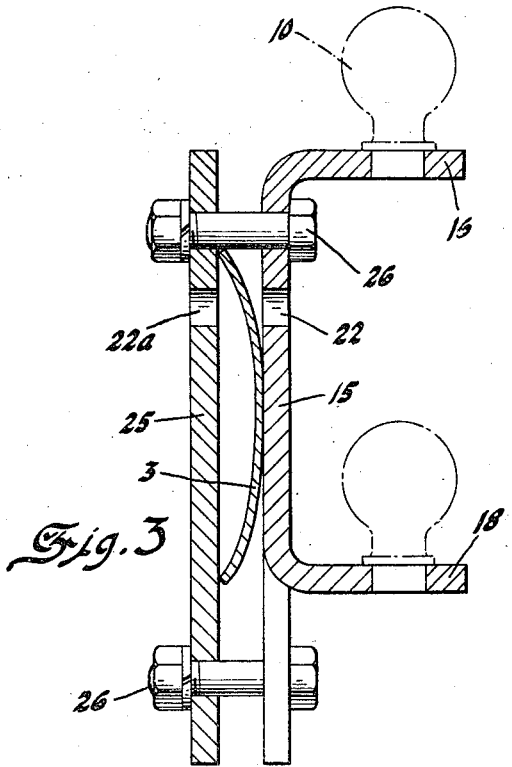
Fig. 3 is another enlarged view illustrating another position of adjustment of the hitch.

Now it may be that neither of these four positions appear to be just exactly right for the best performance and the assembly may be mounted as shown in Fig. 3. In this mounting, the hitch plate is dropped and the bolts extending across the top of the bumper are passed through the apertures 23 of the hitch plate and the lower bolts through the apertures 21. In the event the straps are retained in the same position as is shown in Fig. 4, the bolts pass through the strap apertures 21a and 23a with the apertures 21a at the top. Now it will be noted that if the ball is mounted on the support 16, it is in a position intermediate the two top positions shown in Figs. 2 and 4. If the ball is mounted on the support 18, it is in the position intermediate the two lower positions shown in Figs. 2 and 4.

Accordingly, this simple structure affords a mounting for the hitch of a trailer in a plurality of different elevations, there being six positions shown in the present form. The highest position is the top mounting shown in Fig. 4. The next lower is the top mounting shown in Fig. 3. The next lower position is the top mounting shown in Fig. 2. There are three other positions obtained in progresively lower elevations by the lower mountings in Figs. 4, 3 and 2. Thus, the hitch is easily adaptable to accommodate the height that the trailer pole, even though the bumpers or other structure of an automobile vary in height, and further the proper proportioning of the trailer load may be varied relative to its axle as the load may be tipped forwardly or balanced on the axle as desired, although it has been found that if some vertical load is taken at the hitch, a better trailer operation is attained and the adjustment of the hitch plate facilitates of obtaining the best trailer action. It will of course be understood that the ball member of the ball and socket connection may be placed on the trailer pole and the socket on the hitch plate; such a variation would merely amount to an obvious reversal of parts and lies within the invention.

I claim:

1. In a trailer hitch, a hitch member for attachment to a structural part of an automobile and for supporting a connecting member for cooperation with another connecting member on the draft bar of a trailer, comprising a hitch plate of stamped sheet metal having a body portion, a supporting ledge fashioned substantially at right angles to the body portion and near one end, another ledge fashioned substantially at right angles to the body portion and near the opposite end, said supporting ledges adapted to receive and support said connecting member, and means for attaching the body portion to a structural part of an automobile with the supporting ledges disposed one above the other.

2. In a trailer hitch, a hitch member for attachment to a structural part of an automobile and for supporting a connecting member for cooperation with another connecting member on the draft bar of a trailer, comprising a hitch plate formed of fashioned sheet metal having a body portion, one end of the plate being fashioned substantially at right angles to the body portion to provide a support, an intermediate part at the opposite end of the plate being cut out and fashioned to provide another support leaving opposite end projections, said supports adapted to receive and support said connecting member, and means for attaching the body portion to a structural part of the automobile with the supports disposed one above the other.

3. In a trailer hitch, a hitch member for attachment to a structural part of an automobile and for supporting a connecting member for cooperation with another connecting member on the draft bar of a trailer, comprising a hitch plate formed of fashioned sheet metal having a body portion, one end of the plate being fashioned substantially at right angles to the body portion to provide a support, an intermediate part at the opposite end of the plate being cut out and fashioned to provide another support leaving opposite end projections, said supports adapted to receive and support said connecting member, said hitch plate having horizontal groups of apertures therein, some of which are in the projections and some of which are in the body, said hitch plate adapted to be placed against a structural part of an automobile and one or more members adapted to be placed on the other side of said structural part and provided with similar groups of apertures, whereby the hitch plate may be clamped to the structural part in different positions by the use of different groups of apertures.

4. In a trailer hitch, a hitch plate for supporting a connecting member of a ball and socket trailer connection and adapted to be secured to a structural part of an automobile comprising a sheet metal member having a body portion, one end thereof being cut inwardly at spaced points to provide an intermediate portion, said intermediate portion being fashioned substantially at right angles relative to the body and constituting a support for one connecting member, the opposite end of the member being fashioned substantially at right angles to the body to form another support for said connecting member, said member having projections at opposite edges, one of each side of the said intermediate portion, said hitch plate having apertures therein, some extending through the projections and some through the body for the reception of bolts for attachment to a structural part of an automobile.

5. In a trailer hitch, a hitch plate for supporting a connecting member of a ball and socket trailer connection and adapted to be secured to a structural part of an automobile, comprising a sheet metal member having a body portion, one end thereof being cut inwardly at spaced points to provide an intermediate portion, said intermediate portion being fashioned substantially at right angles relative to the body and constituting a support for one connecting member, the opposite end of the member being fashioned substantially at right angles to the body to form another support for said connecting member, said member having projections at opposite edges, one on each side of the said intermediate portion, said hitch plate having apertures therein, some extending through the projections and some through the body for the reception of bolts for attachment to a structural part of an automobile, and a pair of clamping straps, one adapted to lie in alignment with each projection and having apertures for the reception of the clamping bolts.

6. In a trailer hitch, a hitch plate for attachment to a structural part of an automobile and for supporting a connecting member of ball and socket trailer connection, said hitch plate having one end fashioned outwardly to form a supoprt, the opposite end being cut inwardly to form an intermediate portion and opposite projections, the intermediate portions being fashioned outwardly to provide a support spaced from the first mentioned support, a plurality of groups of horizontal apertures, some in the projections and some in the body of the plate, said hitch plate adapted to be placed against a bumper of an automobile, clamping means for engaging against the opposite side of the bumper and having similar groups of apertures, said plate and clamping means arranged to be clamped to the bumper by bolts passing through some of the apertures, said hitch plate being vertically adjustable by the use of different apertures and providing two supports in different horizontal planes, said hitch plate being reversible whereby the two supports are in different planes than in the first position.

7. In a trailer hitch, the combination of a ball member and socket member of a trailer hitch, a hitch plate having two vertically disposed supports for the reception of one member, clamping means with similar apertures therein, whereby the plate and the clamping means may be attached to a bumper by bolts located in the apertures, said supports each being located in different planes relative to certain of the apertures, whereby upon reversing of the hitch plate the two supports lie in two planes different from the two planes in the original position.

8. In a trailer hitch, the combination of a hitch member adapted to be mounted on an automotive vehicle, a second hitch member adapted to be mounted on a trailer, said hitch members being of the ball and socket type and arranged to interengage each other to form a draft coupling, a hitch plate having a body portion, means for attaching a hitch plate to the automotive vehicle with the body portion positioned substantially vertically, said hitch plate having supports extending rearwardly from the automotive vehicle and disposed substantially in horizontal planes and one above the other, each support adapted to receive and individually support the first mentioned hitch member, means on said first mentioned hitch member for attachment individually to one of the supports, the vertical space between the supports being such that the upper support is clear of both the hitch members when the same are interengaged and attached to the lower support.

J. CLYDE McKEE.